United States Patent Office.

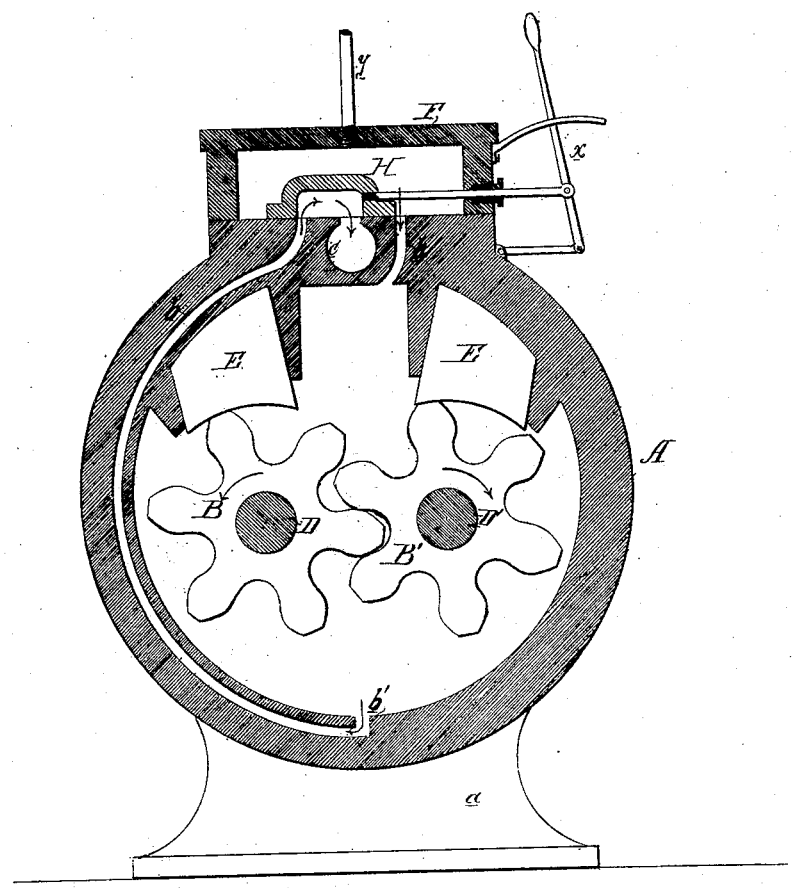

GEORGE S. FOLLENSBEE, OF PHILADELPHIA, PENNSYLVANIA, ASSIGNOR TO HIMSELF AND JOHN ROSENCRANTZ, OF SAME PLACE.

Letters Patent No. 110,350, dated December 20, 1870.

IMPROVEMENT IN ROTARY STEAM-ENGINES.

The Schedule referred to in these Letters Patent and making part of the same.

I, GEORGE STORES FOLLENSBEE, of Philadelphia, county of Philadelphia, State of Pennsylvania, have invented an Improvement in Rotary Steam-Engines, of which the following is a specification.

Nature and Object of the Invention.

My invention relates to an improvement in that class of rotary engines in which a pressure of steam is caused to act upon and revolve two cog-wheels, geared together within a closed cylinder; and The improvement consists of an arrangement of steam and exhaust-ports or passages, and a valve, by which, as hereafter described, steam can be caused to enter the cylinder either above or below the cog-wheels, and thus impart either a direct or reverse movement to the same.

In the accompanying drawing—

The figure represents a sectional elevation of a rotary steam-engine with my improvement.

General Description.

A represents a short cylinder, resting upon a suitable base, $a$, and having a fixed and a detachable head, between and in contact with the inner ground surfaces of which revolve two cog-wheels, B and B', these cog-wheels being geared together within the cylinder, and being fixed to spindles D and D, which revolve in closed bearings formed in the cylinder-heads, one end only of the spindle D extending through a stuffing-box in one of the heads, and being connected by any suitable system of gearing with an adjacent machine or line of shafting.

Two segmental bearing-surfaces or blocks, E E, concentric with and in contact with the teeth of the the wheels B and B', are arranged within the cylinder in such a manner that they can be adjusted or set up by set-screws or otherwise, when worn away by the action of the teeth.

The latter are so accurately formed that they will always be in steam-tight contact at the points where they gear into each other, and will thus prevent leakage between the two wheels.

Thus far the engine is precisely similar to that for which application for Letters Patent was made by me on the 21st day of April, A. D. 1870, which engine was operated by admitting steam through an opening in the top of the cylinder between the segmental bearings, the pressure of the steam acting upon and revolving the cog-wheels in the direction indicated by the arrows in the drawing, and the steam, after having performed its duty, passing off through an exhaust-opening at the bottom of the cylinder.

I have ascertained since, in practically testing this engine, that by admitting the steam at the bottom instead of at the top of the cylinder, a reverse motion of the cog-wheels can be obtained, and my present improvement consists of an arrangement of steam and exhaust-passages, and of a valve by which, as I will now proceed to describe, the steam can be caused to enter the cylinder either above or below the wheels, and thus produce either a direct or reverse motion of the engine.

Instead of a simple opening at the top and bottom of the cylinder for the admission and escape of the steam there are two passages or channels, $b$ and $b'$, the former of which establishes a communication between the interior of the cylinder above the wheels and a steam-chest, F, secured to the top of said cylinder, while the latter extends entirely around and through one side of the cylinder, and forms a communication between the bottom of the same and the steam-chest.

An exhaust-opening, $c$, communicates with the steam-chest between the two ports, and a slide-valve, H, of ordinary construction, contained within the steam-chest and operated by a lever, $x$, or otherwise, is arranged to cover the passage $b'$ and the exhaust when at the limit of its movement in one direction, and to similarly cover the exhaust and passage $b$ when at the limit of its movement in the opposite direction.

It will be readily understood without further description that, when the parts are in the position illustrated in the drawing, and steam is caused to enter the steam-chest through the pipe $y$, it will pass through the channel $b$ into the cylinder, cause the cog-wheels to revolve in the direction indicated by the arrows, return through the passage $b'$, and pass beneath the valve H into the exhaust-opening $c$.

It will also be understood that when the valve is moved to such a position as to cover the passage $b$ and the exhaust, the live steam will pass downward through the channel $b'$, enter the bottom of the cylinder, reverse the motion of the wheels, and be finally exhausted through the passages $b$ and $c$.

Claim.

In an engine consisting of a case containing two cog-wheels, B B', arranged to operate as described, ports $b$ $b'$ $c$ and a valve, H, arranged and operating as set forth.

In testimony whereof I have signed my name to this specification in the presence of two subscribing witnesses.

GEO. S. FOLLENSBEE.

Witnesses:
WM. A. STEEL,
HARRY SMITH.